United States Patent

Baldwin

[15] 3,651,456
[45] Mar. 21, 1972

[54] WARNING DEVICE FOR USE IN VEHICLE HYDRAULIC BRAKE SYSTEM

[72] Inventor: Philip Sidney Baldwin, Florence, Italy
[73] Assignee: Fiat Societa per Azioni, Turin, Italy
[22] Filed: Sept. 24, 1969
[21] Appl. No.: 860,597

[30] Foreign Application Priority Data

Oct. 10, 1968 Italy..................................53431-A/68

[52] U.S. Cl. ..............................340/60, 180/103, 303/84 A, 340/52 C
[51] Int. Cl. ........................................B60q 1/00, B60t 17/22
[58] Field of Search ....................340/60, 59, 52 C, 136, 242, 340/239; 200/81.9; 73/209; 180/103; 303/84 A

[56] References Cited

UNITED STATES PATENTS

| | | | |
|---|---|---|---|
| 2,254,990 | 9/1941 | Blank | 303/84 A |
| 2,265,117 | 12/1941 | Seymour | 303/84 A |
| 2,747,042 | 5/1956 | Zimmerman | 200/81.9 |
| 3,154,350 | 10/1964 | Majanovic | 303/84 A |

Primary Examiner—Thomas B. Habecker
Assistant Examiner—Glen R. Swann, III
Attorney—Sughrue, Rothwell, Mion, Zinn & Macpeak

[57] ABSTRACT

The invention provides a warning device for providing an automatic warning of a fall in braking pressure in an hydraulic brake system. The device is connected in the fluid circuit between the master cylinder and the brake actuators and includes a metal ball which, in normal operation of the brake, rests, for example under spring pressure, against an abutment surface in a chamber formed in the body of the device. Should the pressure in the system downstream of the device fall, the ball is drawn away from this abutment surface by the resulting fluid flow through the chamber and contacts an insulated metal pin in the chamber to complete an energizing circuit of a warning indicator device, conveniently a warning lamp.

15 Claims, 5 Drawing Figures

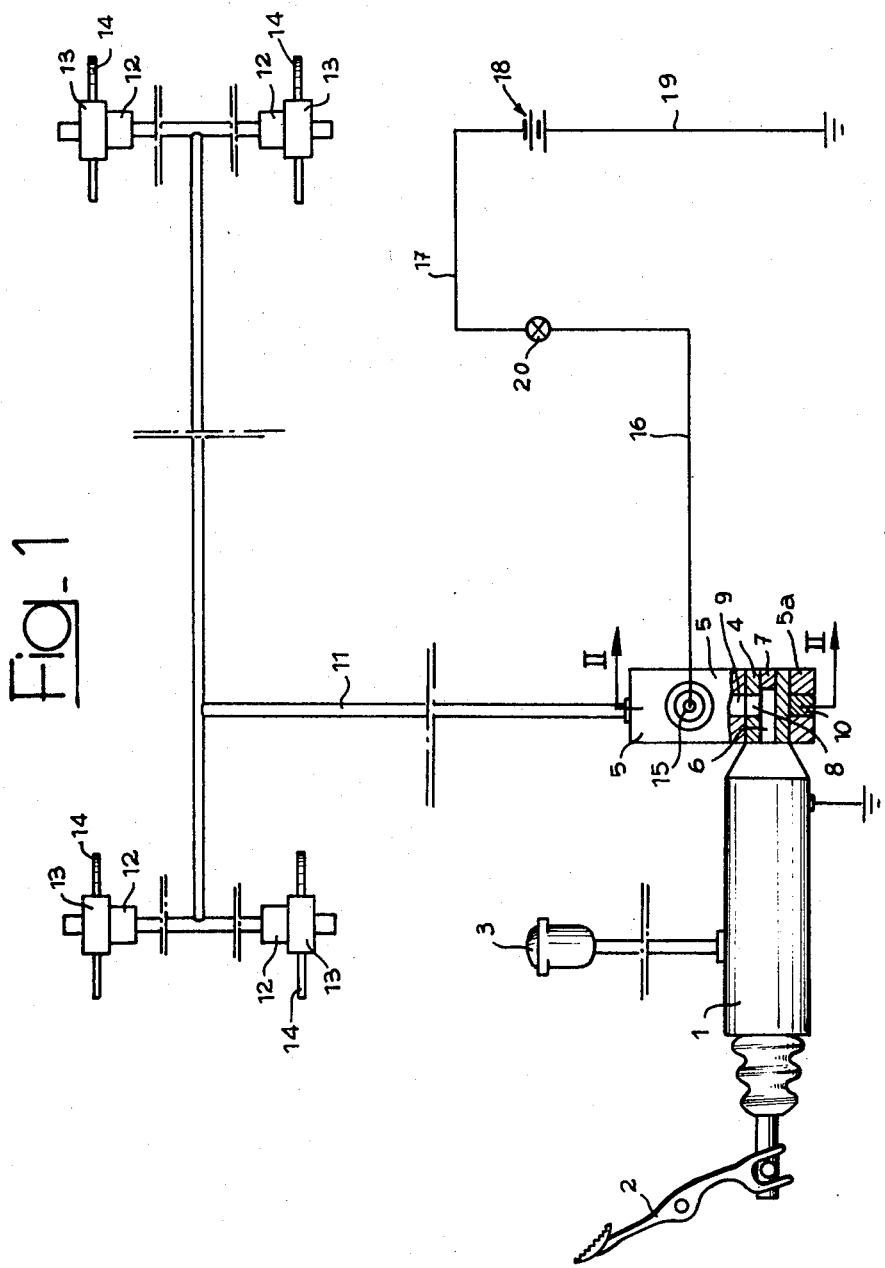

WARNING DEVICE FOR USE IN VEHICLE HYDRAULIC BRAKE SYSTEM

This invention relates to warning devices for use in vehicle hydraulic brake systems.

An object of the invention is to provide a warning device for giving an automatic indication of failure in the brake system of the kind which leads to a fall of brake pressure between the master cylinder and the hydraulic brake-actuating circuit. In particular, the device of the present invention is intended to give a warning indicating such failure preferably before the failure renders the hydraulic brake system of the vehicle wholly inefficient or inoperative.

According therefore to this invention there is provided a warning device for a vehicle hydraulic brake system for providing automatic warning of a fall in braking pressure in the system, characterized in that the device comprises in combination a body having an internal cylindrical chamber in which a ball is located with freedom to move axially therein, the ball being urged by gravity or by resilient means into a rest position against a closed end surface of the chamber, respective inlet and outlet ports in the wall of the cylindrical chamber adapted to be connected respectively to a master braking cylinder and to a hydraulic fluid conduit leading to hydraulic brake actuators, and an electrcially insulated contact connected to an energizing circuit for a warning indicator device such as a lamp and located in the chamber in such a position that it can be touched by the ball when the latter is displaced from its rest position, the position of the said inlet and outlet ports, and the shape of the end surface being such that the ball is displaced from its rest position to touch the electrical contact and complete the energizing circuit for the indicator device only when a pressure drop between the inlet and outlet ports is caused by hydraulic fluid flow through the chamber resulting from loss of hydraulic fluid from or the presence of air in the brake operating circuit.

Further characteristic features of the invention will be apparent from the description which follows, given by way of example, with reference to the accompanying drawings which illustrate two alternative embodiments and in which:

FIG. 1 is a diagrammatic view of a vehicle hydraulic brake system of a single circuit type provided with a warning device according to one embodiment of the invention;

FIG. 1 illustrates diagrammatically the hydraulic brake system of a vehicle having disc brakes on all its four wheels.

Figure 3:
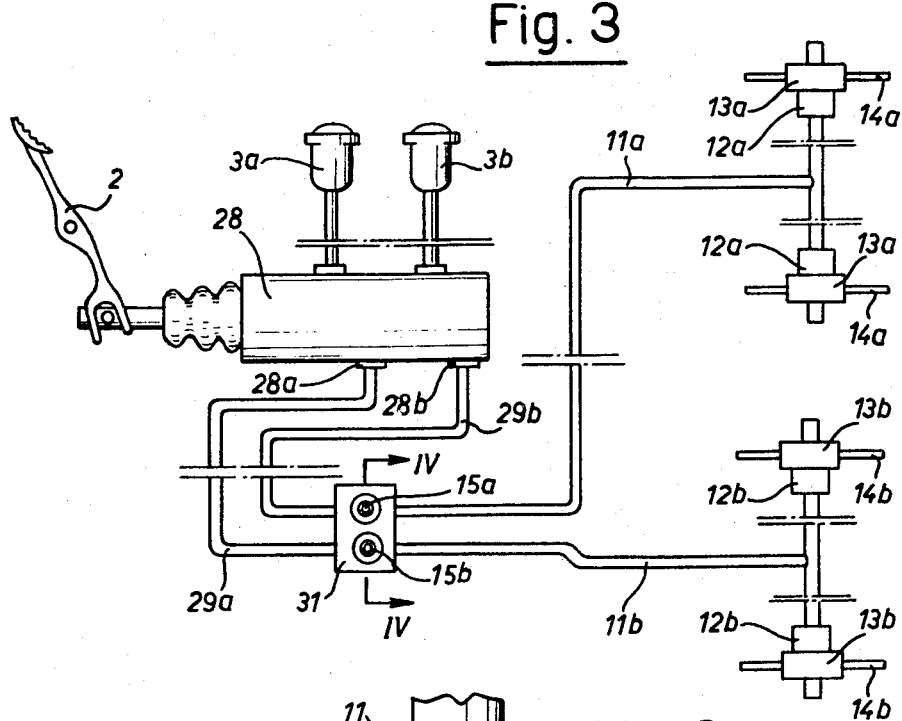
FIG 3 shows diagrammatically a vehicle hydraulic brake system of a double circuit type provided with a warning device according to a second embodiment of the invention.

The hydraulic brake system includes a master cylinder 1 the plunger (not shown) of which is operated by a brake pedal 2. The cylinder 1 is supplied with hydraulic fluid from a reservoir 3. The end of the cylinder 1 opposite the pedal 2 has a boss 4 inserted in a through bore in a boss 5a formed in the body 5 of a warning device according to the invention, which device will be described in detail later. The boss 4 has an axial bore 6 closed at its end remote from the pedal 2 by a plug 7 and communicating by way of a radial drilling 8 with an internal radial inlet port 9 in the body 5 of the warning device. The inlet port 9 is formed by a cross bore the portion of which between the boss 4 and the exterior of the body 5 is closed by means of a plug 10.

The body 5 of the warning device has an outlet communicating with a conduit 11 connected through branch conduits with four brake cylinders 12 carried by respective pincers 13 which straddle respective brake discs 14. The brake discs 14 rotate with the respective wheels (not illustrated) of the vehicle.

A metallic contact pin 15 protrudes from the body 5 of the device, the pin 15 being connected in series through leads 16 and 17 with an indicator device in the form of a waring indicator lamp 20 and a battery 18, the positive terminal of the battery 18 being connected to earth through a lead 19.

The body 5 (FIG. 2) has a cylindrical internal chamber 21 constituted by a drilling closed from the outside by means of a screw plug 22. A ball 23 is disposed loosely in said chamber 21, the diameter of the ball 23 being substantially equal to or less than the diameter of the transverse cross section of the cylindrical chamber 21. The ball 23 seats upon a conical closed end surface 24 of the chamber 21, formed by drilling the chamber 21 using a drill having a conical point of 45°. The ball 23 is held against said surface 24 by the action of a light spring 25 which is compressed between the ball 23 and an annular shoulder on the plug 22.

The chamber 21 is illustrated with its axis horizontal but it could equally well be vertical, with the plug 22 uppermost; in such case the spring 25 could be dispensed with since the ball 23 would rest on the conical surface 24 by means of its own weight.

The plug 22 has an axial through bore into which is inserted, with the interposition of a bush 26 of insulating material the said contact pin 15, the opposite ends of the pin 15 projecting from the internal and external ends of the bush 26. The position of the inlet port 9, which communicates with the outlet of the master cylinder 1, is such that its axis is perpendicular to the axis of the cylindrical chamber 21 and passes through the center of the ball 23 when the latter is in its normal or rest position illustrated in FIG. 2, in which it is seated on the conical surface 24. The conduit 11, which serves the brake cylinders 12, communicates with an internal outlet port 27 in the body 5. The axis of the outlet port 27 is parallel to the axis of the inlet port 9 but is displaced relatively to the latter in the direction of the plug 22.

Figure 4:
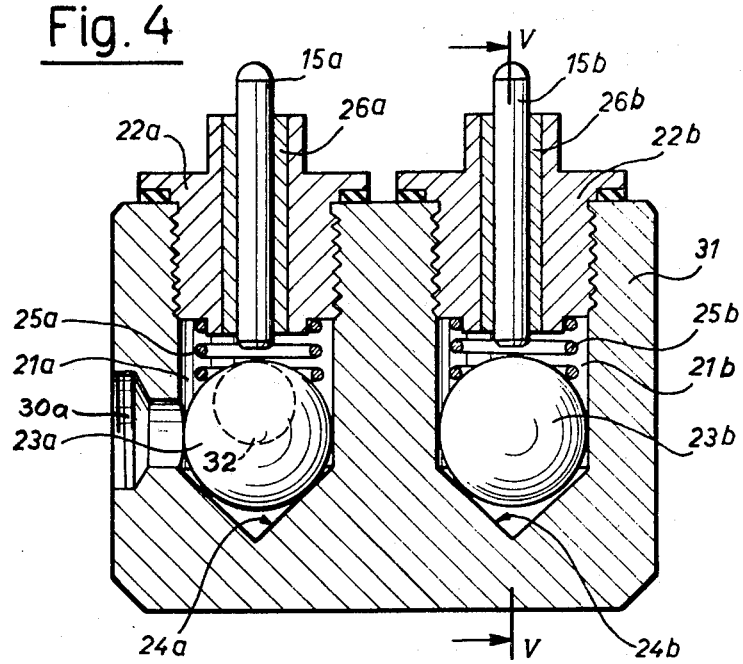
FIG. 4 is a partial longitudinal section on a larger scale, taken on line IV—IV of FIG. 3, with the left half of the drawing showing a modified construction
Figure 5:
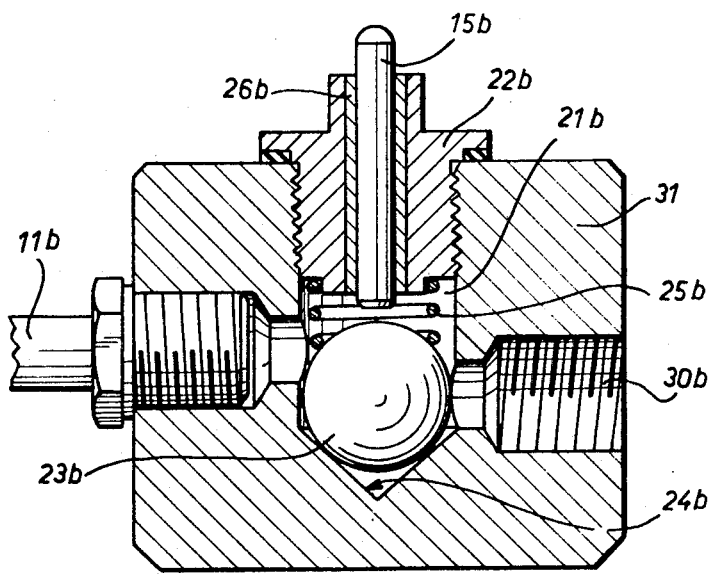
FIG. 5 is a section on line V—V of FIG. 4.

In the embodiment illustrated in FIGS. 3 to 5, the brake system has a master cylinder 28 of a type supplying two separate braking circuits. The master cylinder 28 has two outlets 28a and 28b and is supplied with hydraulic fluid from reservoirs 3a and 3b. The outlets 28a and 28b communicate by means of conduits 29a and 29b respectively with respective inlet ports, one of which, 30b, is shown in FIG. 5, of respective warning devices. The warning devices are substantially identical, and one said device is illustrated in FIG. 5, contained within a single body 31. The left hand warning device shown in FIG. 4 is modified to show the inlet port 30a at right angles to outlet port 32.

Figure 2:
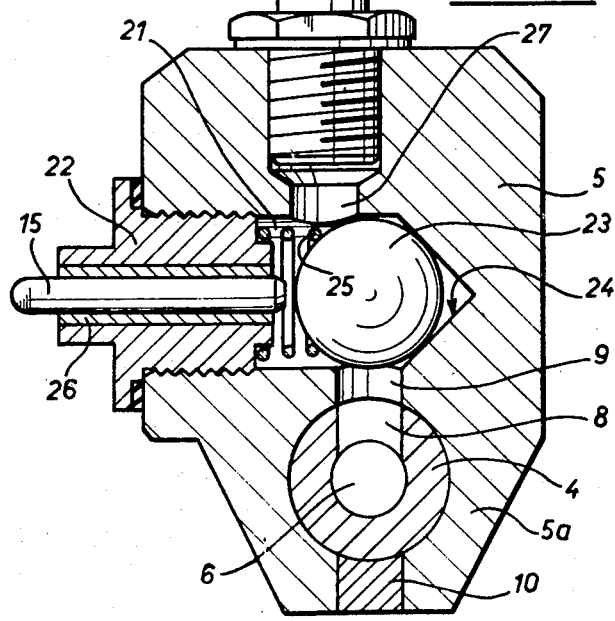
FIG. 2 is a longitudinal section, shown on a larger scale, taken on line II—II of FIG. 1.

The construction of the body 31 differs from that of the body 5 illustrated in FIGS. 1 and 2, in that the boss 5a is absent. Other constructional particulars of the device within the body 31, and its electrical circuit, are identical with those of the device illustrated in FIG. 2. Hence the component parts of this device and its electrical circuit are indicated with the same reference numerals as those used to indicate equivalent parts of the device illustrated in FIGS. 1 and 2, with the addition of the letters a and b, according to whether reference is to the device illustrated on the left or the right of FIG. 4.

The mode of operation of the device illustrated in FIGS. 1 and 2 is as follows: the load of the spring 25 on the ball 23, the positions of the inlet port 9 and of the outlet port 27, as well as the shape of the conical surface 24 are such as to ensure that the ball 23 remains virtually immovable in its rest position in the cylindrical chamber 21 when braking is effected under conditions of normal operation of the braking system.

In the event of a loss of pressure in the braking system downstream of the warning device, that is, in the conduit 11 or any part of the hydraulic circuit communicating therewith, a pressure drop occurs between the inlet port 9 and the outlet port 27 due to the flow of hydraulic fluid occuring between the said ports. The ball 23 is drawn along by this flow and is displaced against the action of the spring 25 until it rests against the electrical contact pin 15 and so completes the circuit of the waring indicator lamp 20, which is therefore lit up.

The functioning of the two warning devices contained within the body 31 in the embodiment illustrated in FIGS. 3 and 5 is identical with that of the device of FIGS. 1 and 2 described above.

The warning device according to the invention is applicable particularly to hydraulic brake systems of the type in which an appreciable flow of hydraulic fluid does not normally occur between the master cylinder and the brake cylinders during braking, for example, as illustrated, a braking system provided with disc brakes.

In any case, the device does not operate to provide a warning in response to a weak flow of hydraulic fluid between the inlet and the outlet ports, such as may occur, for example, by reason of dilation of the brake conduits due to high braking pressures. This means that the device will not in response to such weak flow give a warning, that is, it will not cause the warning lamp 20 to be lit, if the flow of hydraulic fluid through the system downstream of the device is not sufficient to induce a flow through the device of such quantity as to bring about displacement of the ball 23 into engagement with the electric contact pin 15, or if there has not been sufficient escape of fluid at a point in the system at which a pressure loss occurs.

On the contrary, however, a brake system failure leading to a more pronounced flow of fluid through the device can be registered. Such flow will occur long before the pressure loss reaches an amount such as to require an unacceptably long operating stroke of the operating plunger in the master cylinder and, therefore, an intolerably large operating travel of the brake pedal.

As can be seen from what has gone before, the device is of very simple construction in that it has only one movable part, that is, a metal ball held in place resiliently by a spring.

The functioning principle, too, is simple in that it consists, in essence, of keeping the ball immovable under normal braking conditions, when brake-operating pressure is transmitted to the brake cylinders from the master cylinder. In the event of a failure of that part of the hydraulic system which is situated downstream of the device, with a consequent fall of pressure between the inlet and outlet ports of said device, the ball follows the fluid flow towards the damaged circuit, and, touching the electrical contact pin, ignites the relevant warning lamp, indicating brake system failure. A similar action results when air gets into the circuit.

The device is minimal in bulk, and this makes it possible to assemble it even at the two outlets of a master cylinder of the "tandem" type.

According to requirements the device may be mounted in any position of the vehicle and the inlet and outlet ports may be placed in the body of the device, either in line or at right angles to each other.

Naturally, details of embodiments of the invention can be varied widely from what is described and illustrated herein purely by way of example, without departing from the scope of the present invention as defined in the appended claims.

I claim:

1. Warning device for a vehicle hydraulic brake system of the kind having a master braking cylinder, hydraulic brake actuators, and a hydraulic fluid circuit interconnecting the master cylinder and said actuators, said device providing automatic warning of a fall in braking pressure in the system, characterized in that the device comprises in combination:
    a. a body having an internal cylindrical chamber;
    b. a closed end surface in said chamber;
    c. a ball located within said chamber with freedom to move axially therein;
    d. means urging the ball into a rest position against the closed end surface of the chamber;
    e. respective inlet and outlet ports in the wall of the cylindrical chamber for connection respectively to the master braking cylinder and to the hydraulic fluid circuit leading to the hydraulic brake actuators;
    f. an electrically insulated contact located in the chamber in a position such that it is contacted by the ball when the latter is displaced from its rest position;
    g. a warning indicator device, and
    h. an energizing circuit for said indicator device, said circuit including said contact, the position of the said inlet and outlet ports, and the shape of the end surface being such that the ball is displaced from its rest position into contact with the electrical contact to complete the energizing circuit for the indicator device only upon the occurrence of a pressure drop between the inlet and outlet ports due to hydraulic fluid flow through the chamber resulting from loss of pressure in the hydraulic circuit.

2. Device as claimed in claim 1, wherein body includes a blind bore defining said chamber, said bore having a diameter less than its length, and a plug closing said bore on the outside of the body.

3. Device as claimed in Claim 2, wherein the said contact comprises a metallic contact pin extending coaxially through said plug and electrically insulting bush surrounding the pin and insulating it from the plug.

4. Device as claimed in claim 1, wherein the means urging the ball into its rest position comprise resilient biassing means.

5. Device as claimed in claim 4, wherein the resilient biassing means comprise a spring which thrusts the ball against the said end surface of the cylindrical chamber.

6. Device as claimed in claim 1, wherein said end surface is disposed at the bottom of the chamber, the ball being movable vertically, and being urged into its rest position by gravity.

7. Device as claimed in claim 1, wherein the end surface of the cylindrical chamber is conical and is coaxial with the said chamber.

8. Device as claimed in claim 1, wherein the diameter of the ball is less than that of the transverse cross section of the cylindrical chamber.

9. Device as claimed in claim 1, wherein the diameter of the ball is equal to that of the transverse cross section of the cylindrical chamber.

10. Device as claimed in claim 1, wherein the axis of the inlet port coincides with the center of the ball when the latter is resting upon the end surface of the said cylindrical chamber.

11. Device as claimed in claim 10, wherein the said axis of the inlet port is perpendicular to the axis of the said cylindrical chamber.

12. Device as claimed in claim 10, wherein characterized the axis of the outlet port is parallel to the axis of the inlet port and is displaced in relation to the latter axially of the chamber on the side of the inlet port remote from the end surface of the chamber.

13. Device as claimed in claim 1, wherein the body includes a boss having a bore with which the inlet port communicates, said bore being adapted to receive a cylindrical boss of the master cylinder and to communicate with the cylinder through internal passages in said cylindrical boss.

14. Device as claimed in claim 1, wherein the axis of the said outlet port is inclined at an angle to the axis of the inlet port.

15. Device as claimed in claim 14, wherein said angle of inclination is a right angle.

* * * * *